United States Patent [19]

Schlienger

[11] Patent Number: 4,912,296
[45] Date of Patent: Mar. 27, 1990

[54] ROTATABLE PLASMA TORCH

[76] Inventor: Max P. Schlienger, 490 Highland Dr., Ukiah, Calif. 95482

[21] Appl. No.: 270,133

[22] Filed: Nov. 14, 1988

[51] Int. Cl.$^4$ .............................................. B23K 9/00
[52] U.S. Cl. : ........................... 219/121.59; 219/121.37; 219/121.38; 219/121.52; 219/121.5; 373/18; 373/20
[58] Field of Search ........... 219/121.48, 121.5, 121.52, 219/74, 75, 121.37, 121.38, 121.59; 313/231.21, 231.31, 231.41; 373/18–24

[56] References Cited

U.S. PATENT DOCUMENTS

| | | | |
|---|---|---|---|
| 3,821,455 | 6/1974 | Greenwald, Jr. | 373/20 |
| 3,940,641 | 2/1976 | Dooley | 219/121.52 |
| 4,301,352 | 11/1981 | Shipai et al. | 219/121.52 |
| 4,338,509 | 7/1982 | Bartuska et al. | 219/121.52 |
| 4,803,332 | 2/1989 | Koyama et al. | 219/121.52 |

Primary Examiner—M. H. Paschall
Attorney, Agent, or Firm—Townsend and Townsend

[57] ABSTRACT

An improved plasma torch having a rugged configuration, which is easier to start, and which eliminates the need for fragile and possibly metal contaminating insulators from the lower end of the plasma torch. To prevent double arcing from occurring and to enable the elimination of costly insulators from the nozzle area, the electrode and nozzle of the plasma torch of a first embodiment of the present invention are rotated as a unit at a speed in the range of 0 to 400 rpm. In a second embodiment of the invention, the nozzle assembly rotates relative to the electrode which is normally stationary. The electrode and nozzle could rotate in opposite directions as well. When the nozzle assembly is rotated, the resident arc time would be of such short duration due to the spinning of the nozzle that serious damage to the nozzle would not occur. The rotating nozzle can be advanced into an area and, should it strike an unexpected obstruction, the possibility of damage to the nozzle or to the outer electrode area will be greatly reduced or, in most cases, eliminated. The rotating nozzle will also enhance torch starting with a pilot arc as the arc transferred from the nozzle to the work piece will transfer from the plasma torch electrode to the work piece when the torch is withdrawn or moved to eliminate the double arcing.

9 Claims, 4 Drawing Sheets

FIG_1

ROTATABLE PLASMA TORCH

FIELD OF THE INVENTION

This invention relates to improvements in heat sources for the high temperature melting of metals and other materials and, more particularly, to an improved plasma torch.

BACKGROUND OF THE INVENTION

In consideration of non-consumable melting systems for melting a variety of materials and also heating applications, the plasma torch has come to be favored for many special applications where relatively high temperature, flexible heating systems are required. Such applications include metal melting, powder production, waste incineration, and many other applications requiring a high temperature, non-contaminating electrical heat source.

The plasma torch is also deemed a desirable heat source because of the relatively long arcs that can be generated as compared to other arcing systems using considerably shorter arcs. In such other systems, shorter arcs are not useful for many applications and do not have the precision or directional capabilities found to be characteristics of the more advanced plasma torch designs.

One major disadvantage of the transferred arc plasma torch is a problem referred to as double arcing which is caused when the nozzle of the torch strikes a grounded object, causing an arc from the nozzle to the object. Such an arc may cause extreme damage to the nozzle or complete destruction of the nozzle if prolonged arcing occurs. A need, therefore, exists for an improved design of a plasma torch having the capability of avoiding the problem of double arcing mentioned above.

SUMMARY OF THE INVENTION

The present invention provides an improved plasma torch having a rugged configuration, which is easier to start, and which eliminates the need for fragile and possibly metal contaminating insulators from the lower end of the plasma torch.

To prevent the double arcing effect from occurring and to enable the elimination of costly insulators from the nozzle area, the electrode and nozzle of the plasma torch of a first embodiment of the present invention are rotated as a unit at a speed in the range of 0 to 400 rpm. Although higher speeds can be applied, they would not normally be necessary and would only require a higher driving power source and more wear and tear on bearings, slip rings, rotary water joints and other moving parts. In a second embodiment of the invention, the nozzle assembly rotates relative to the electrode which is normally stationary. The electrode and nozzle could rotate in opposite directions as well.

When the nozzle assembly is rotated, the resident arc time at the time of arcing will be of such short duration due to the spinning of the nozzle that serious damage to the nozzle will not occur. This principal is what the Rototrode (rotating non-consumable electrode) applies to enable the melting of a variety of conducting materials.

Another advantage of the rotating plasma torch of the present invention is the added simplicity of torch starting procedures when one cannot visibly determine the location of metal to be melted. The rotating nozzle can be advanced into an area and, should it strike an unexpected obstruction, the possibility of damage to the nozzle or to the outer electrode area will be greatly reduced or, in most cases, eliminated.

The rotating feature of the nozzle of the plasma torch of the present invention will also enhance torch starting with a pilot arc as the arc transferred from the nozzle to the work piece will transfer from the plasma torch electrode to the work piece when the torch is withdrawn or moved to eliminate the double arcing.

The primary object of the present invention is to provide an improved plasma torch which is provided with a rotating nozzle to avoid double arcing of the torch which is caused when the nozzle of a torch strikes a grounded object, causing an arc from the nozzle to the object.

Other objects of this invention will become apparent as the following specification progresses, reference being had to the accompanying drawings for an illustration of an embodiment of an invention.

IN THE DRAWINGS

DETAILED DESCRIPTION OF THE DRAWINGS

Figure 1:
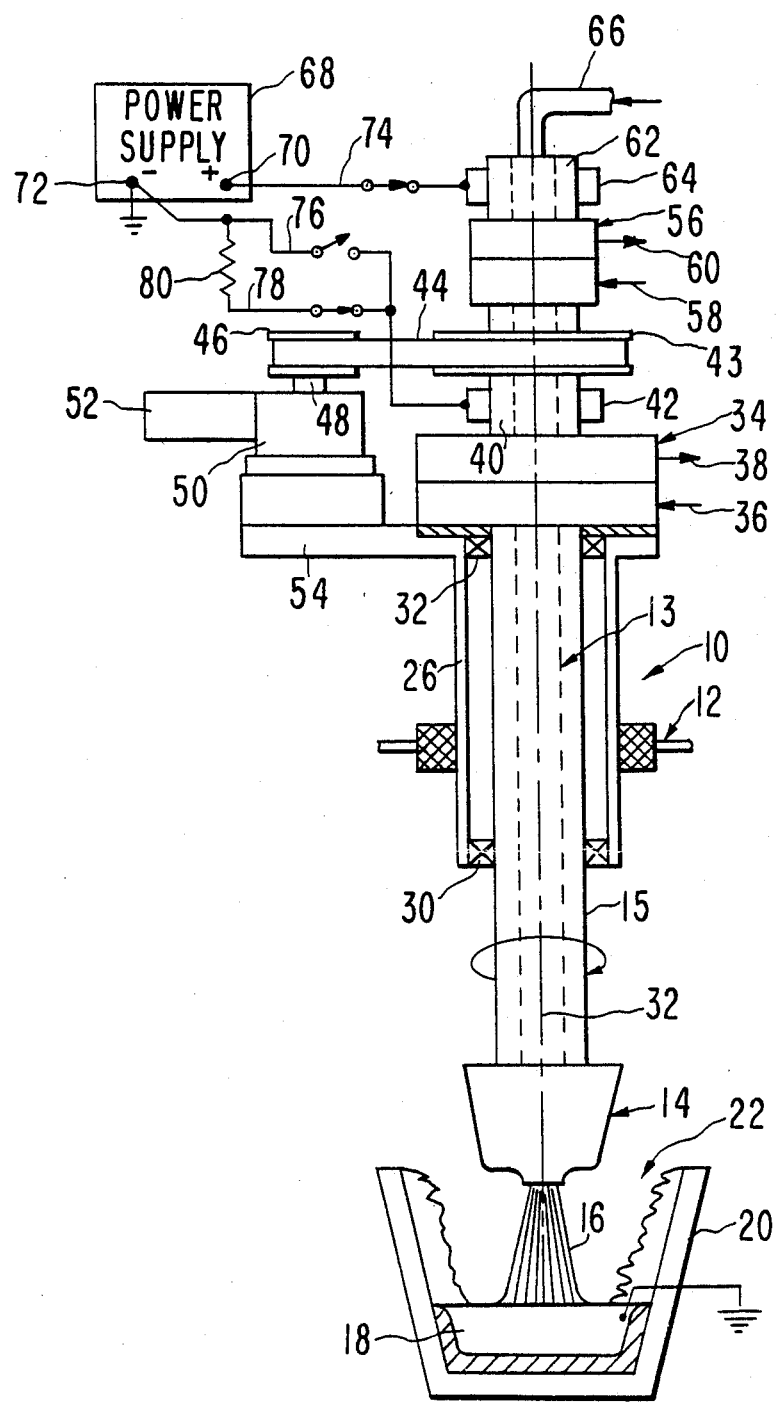
FIG. 1 is a schematic view of a rotating plasma torch of the present invention with the torch being shown for heating a work piece in an open top vessel.

The first embodiment of the plasma torch of the present invention is broadly denoted by the numeral 10 and is shown in FIG. 1. Plasma torch 10 is coupled with a fixed support 12, such as a stationary RAM, which is non-rotatable. The plasma torch has a hollow electrode 13 with a hollow shaft 15. A nozzle assembly 14 is at the normally lower most end of electrode 13, and a tube 66 is provided at the upper end of the electrode for directing a plasma stream into and through the electrode and the nozzle so that the plasma issues from the nozzle as a stream 16 onto a work piece 18, such as a mass of a metal to be melted. The work piece is within a vessel 20 having an open top 22 for partially receiving the nozzle 14 and allowing plasma stream 16 to be directed onto the work piece as shown in FIG. 1.

Shaft 15 is normally vertical and has a lower end on which nozzle 14 is mounted. Shaft 15 is rotatably received within a sleeve 26 rigidly coupled to support 12. An insulated lower bearing 30 and an insulated rotary seal 32 are mounted within sleeve 26 for rotatably mounting shaft 15 in the sleeve for rotation about the central axis 32 of shaft 15.

A rotary water joint 34 is coupled with shaft 15 above the upper end of sleeve 26. Rotary joint 34 has a water inlet 36 and a water outlet 38 for directing water through the shaft 15 for cooling purposes.

A slip ring 40 is mounted on rotary joint 34 and has a rotary brush 42 associated with slip ring 40. A pulley 43 is rotatably mounted on shaft 15, and an endless, flexible belt 44 couples pulley 42 with a second pulley 46 on a drive shaft 48 of a gear reducer 50 coupled to a drive motor 52. Gear reducer 50 is mounted on a support plate 54 extending laterally from and secured to the upper end of sleeve 26.

A second water joint 56 is coupled to the upper end of shaft 15, and joint 56 has a fluid inlet 58 and a fluid outlet 60 for directing water into and out of shaft 15 for cooling purposes. A slip ring 62 is mounted on the upper end of joint 56 and has a brush 64 associated with it. Tube 66 directs plasma gas into the upper end of hollow electrode 13 for flow through the electrode to the exit end of nozzle 14.

A power supply 68 is mounted adjacent to plasma torch 10 and has a positive terminal 70 and a negative terminal 72. Negative terminal 72 is grounded and has the same potential as work piece 18 as shown in FIG. 1. A first lead 74 is coupled between terminal 70 and brush 64. A pair of second leads 76 and 78, in parallel with each other, couple terminal 72 to brush 42. Leads 76 and 78 have respective switches in series with the leads. Lead 78 is provided with a resistance 80 which limits the current flow from power supply 68 to brush 42.

In operation, power supply 68 is connected to brushes 42 and 64 as shown in FIG. 1 with the terminal 72 of the power supply being connected either to leads 76 or 78, depending upon the position of the switches associated with leads 76 and 78 and depending upon the need for a pilot arc at nozzle 14. Motor 52 is then energized as plasma gas is directed into and through tube 66 for flow through electrode 13 to nozzle 14. As the motor is energized, shaft 15 is rotated at a speed in the range of 0 to 400 rpm or higher, thereby rotating electrode 13 and nozzle 14 relative to support 12. An ionized plasma stream 16 is formed by the action of the pilot arc and stream 16 then flows from and continues to flow the nozzle to the work piece 18, at a temperature sufficient to melt the work piece and to cause it to be molten.

While the above description relates to the rotational feature of the plasma torch nozzle and electrode together as a unit, in some cases, it will be desirable to have the torch so constructed to enable the nozzle to rotate relative to the electrode for the reasons previously mentioned. It could be advantageous to have the electrode and gas injector assembly maintained in a stationary position or in a non-rotational mode within the confines of the rotating nozzle assembly. The advantage of this configuration is that the pilot arc would be physically moved in relation to the inside diameter of the nozzle assembly. This arrangement eliminates the need for one double passage rotary water joint and also a rotary plasma gas joint. In many cases this would be a very advantageous feature.

Figure 3:
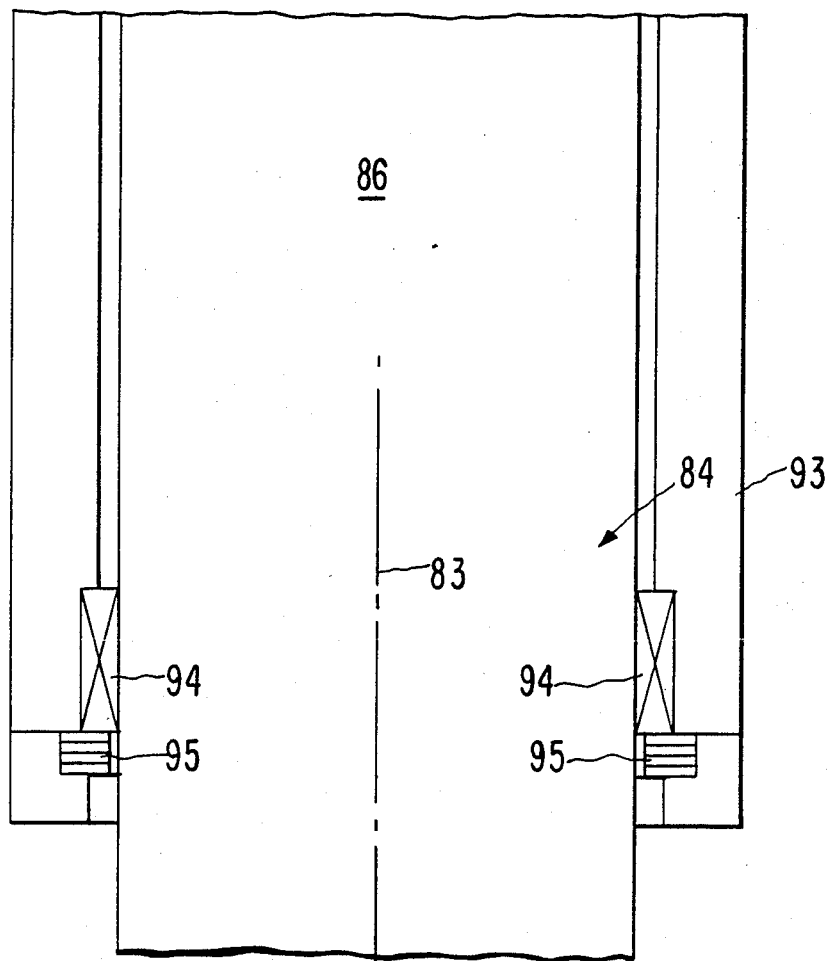
FIG. 3 is a fragmentary, enlarged view of the way in which the electrode is rotatably mounted within a hollow shaft.
Figure 4:
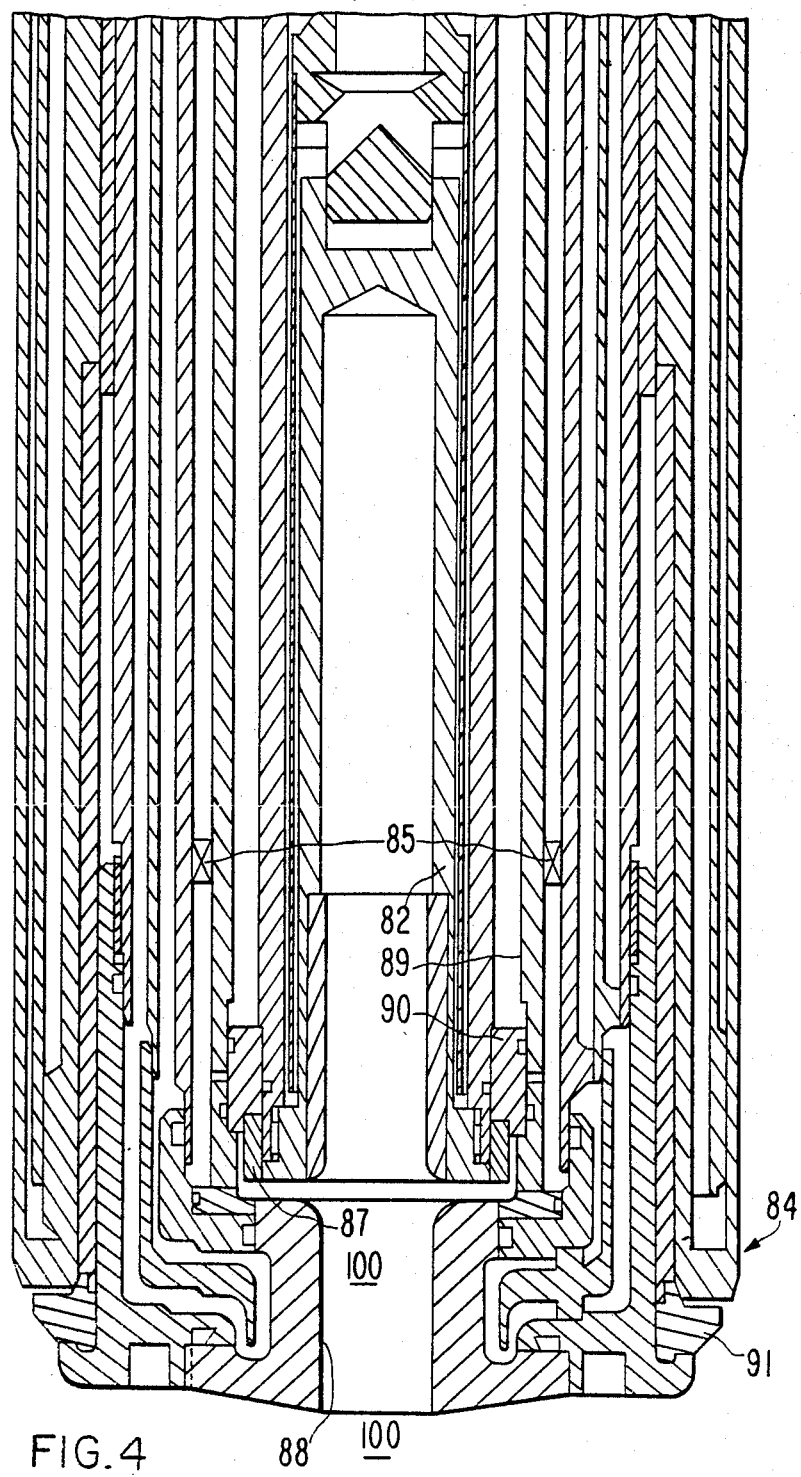
FIG. 4 is an enlarged, fragmentary view showing a rotary nozzle on the lower end of a stationary electrode.

FIGS. 3 and 4 show, in a broad sense, the plasma torch 80 in which the electrode is stationary and the nozzle assembly rotates relative to the lower end of the electrode.

The electrode is denoted by the numeral 82 and rotatably mounts nozzle assembly 84 thereon for rotation relative to and about the longitudinal axis 83 of nozzle assembly 14. Bearings 85 are provided for mounting the shaft-like portion 86 of the nozzle assembly 84 on electrode 82. A gas injector ring 87 is mounted at the lower end of the stationary electrode and is positioned to direct the plasma gas into the nozzle opening 88 of nozzle 84.

An insulation sleeve 89 is between the electrode 82 and nozzle assembly 84. An insulator 90 is between insulator sleeve 89 and the adjacent portion of the electrode 82. Nozzle 84 has an insulator 91 near the lower end thereof.

Figure 2:
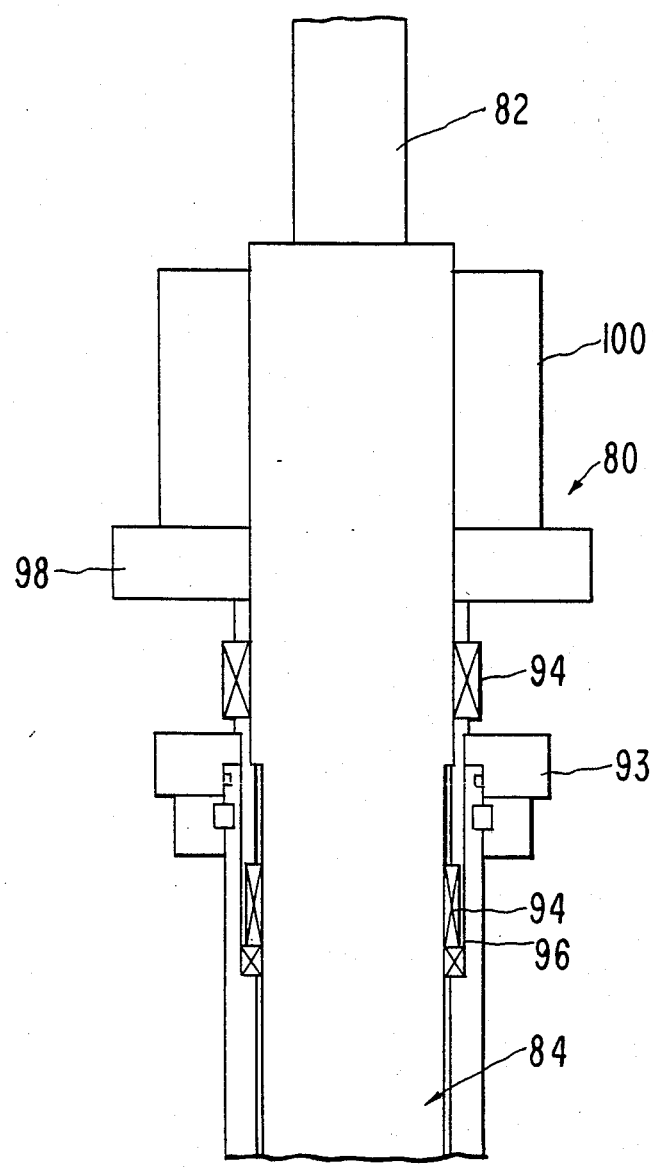
FIG. 2 is a schematic view of a second embodiment of the plasma torch of the present invention showing an electrode on which a rotary nozzle is to be rotatably mounted.

FIGS. 2 and 3 show the torch RAM or fixed support 93 about which the nozzle assembly rotates. The nozzle assembly, denoted by the numeral 84, is rotatably mounted by insulated bearings 94 and the bearings are kept in place by insulating retainers 95. A rotating gas and vacuum seal 96 is shown in FIG. 2 and seal 96 is above insulated bearings 94. A main bearing 97 is provided on torch RAM 92 for rotatably mounting the nozzle assembly. A drive gear or sprocket 98 coupled with the nozzle assembly 84, is adapted to be coupled to a drive motor (not shown) for rotating nozzle assembly 84 relative to electrode 82. A 2 pass water rotary seal 100 allows rotation of nozzle assembly 84 relative to electrode 82.

In operation, the drive motor coupled with gear sprocket 98 causes rotation of nozzle assembly 84 relative to electrode 82. During this time, a voltage source, such as power supply 68, is coupled to slip rings and brushes in the same manner as that described above with respect to plasma torch 10.

A pilot arc in the region of 100 and 101 acts to ionize the gas flowing longitudinally of the electrode. As soon as the gases are ionized, the plasma is established and the plasma is directed against the work piece. The pilot arc switch, such as the switch associated with lead 78 of FIG. 1, is then turned off and the ionized plasma stream, such as stream 16, is directed against the work piece such as work piece 18 of FIG. 1.

Another arrangement would be to move the electrode assembly in an opposite rotation to nozzle assembly thus increasing the relative speed between the electrode and nozzle. However, the mechanical complexity of the latter arrangement would be greater than that experienced with a fixed electrode, non-rotational, and rotating the nozzle assembly.

I claim:

1. A plasma torch comprising:
   a hollow shaft having a central axis;
   means mounting the shaft for axial rotation;
   a hollow electrode within the shaft and extending coaxially thereof;
   means coupled with the shaft for rotating the shaft about said central axis thereof;
   a nozzle on one end of the shaft, said nozzle being rotatable with the shaft, said electrode adapted to receive plasma gas and to direct the plasma gas to the nozzle; and
   means for applying a voltage to the electrode and the nozzle to ionize the plasma gas at the nozzle.

2. A plasma torch as set forth in claim 1, wherein the electrode is rotatable with the shaft and the nozzle.

3. A plasma torch as set forth in claim 1, wherein said electrode is stationary with respect to the shaft and the nozzle.

4. A plasma torch as set forth in claim 1, wherein said electrode is rotatable in one direction relative to the shaft and the shaft and nozzle are rotatable in the opposite direction.

5. A plasma torch as set forth in claim 4, wherein is included means coupled with the electrode for rotating the same in said one direction, said shaft rotating means being operable to rotate the shaft and the nozzle in the opposite direction.

6. A method of forming a plasma torch comprising:
   rotating a hollow shaft about its central axis, there being a hollow electrode within and extending axially of the shaft and a nozzle on one end of the shaft;

rotating said nozzle with the shaft;

directing plasma gas through the electrode to the nozzle; and applying a voltage to the electrode and the nozzle to ionize the plasma gas at the nozzle.

7. A method as set forth in claim 6, wherein is included the step of rotating the electrode with the shaft and the nozzle.

8. A method as set forth in claim 6, wherein is included the step of holding said electrode stationary as the shaft and the nozzle rotate.

9. A method as set forth in claim 6, wherein is included the step of rotating said electrode in one direction, and rotating the shaft and nozzle in the opposite direction.

* * * * *